United States Patent
Jeon et al.

(10) Patent No.: US 9,555,695 B2
(45) Date of Patent: Jan. 31, 2017

(54) VEHICLE DOOR STRUCTURE

(71) Applicant: HYUNDAI MOTOR COMPANY, Seoul (KR)

(72) Inventors: Dongmin Jeon, Hwaseong-si (KR); Dongmin Bae, Hwaseong-si (KR); Jongwon Lee, Seoul (KR); Hyungsik Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/724,742

(22) Filed: May 28, 2015

(65) Prior Publication Data

US 2016/0144693 A1 May 26, 2016

(30) Foreign Application Priority Data

Nov. 21, 2014 (KR) ........................ 10-2014-0163767

(51) Int. Cl.
*B60J 5/04* (2006.01)
*B60R 13/02* (2006.01)

(52) U.S. Cl.
CPC .......... *B60J 5/0468* (2013.01); *B60R 13/0243* (2013.01); *B60J 5/0416* (2013.01)

(58) Field of Classification Search
CPC ......... B60J 5/042; B60J 5/0413; B60J 5/0455; B60J 5/045; B60J 5/0416; B60J 5/0468
USPC .......................................................... 49/502
See application file for complete search history.

(56) References Cited

U.S. PATENT DOCUMENTS

| | | | | |
|---|---|---|---|---|
| 4,648,208 A | * | 3/1987 | Baldamus | B60J 5/0416 49/502 |
| 5,505,024 A | * | 4/1996 | DeRees | B60J 5/0412 296/146.2 |
| 5,904,002 A | * | 5/1999 | Emerling | B60J 5/0406 49/502 |
| 7,364,218 B2 | * | 4/2008 | Radu | B29C 45/1676 296/146.7 |
| 9,283,702 B2 | * | 3/2016 | Reese | B29C 45/1418 |
| 2002/0047289 A1 | * | 4/2002 | Furuyama | B60J 5/0416 296/146.7 |
| 2007/0125003 A1 | * | 6/2007 | Wartzack | B60J 5/0405 49/502 |
| 2009/0056230 A1 | * | 3/2009 | Flendrig | B60J 5/0405 49/502 |
| 2013/0181475 A1 | * | 7/2013 | Torii | B60J 5/0413 296/146.7 |

FOREIGN PATENT DOCUMENTS

| | | |
|---|---|---|
| EP | 1 486 366 | * 12/2004 |
| JP | 2002-002284 A | 1/2002 |
| KR | 10-1997-0035208 A | 7/1997 |
| KR | 10-1997-0069476 A | 11/1997 |

* cited by examiner

*Primary Examiner* — Gregory Strimbu
(74) *Attorney, Agent, or Firm* — McDermott Will & Emery LLP

(57) ABSTRACT

A door structure of a vehicle comprises a door trim and a door trim frame that combines with the door trim to increase stiffness of the door trim.

11 Claims, 6 Drawing Sheets

VEHICLE DOOR STRUCTURE

CROSS-REFERENCE TO RELATED APPLICATION

This application claims the benefit of priority to Korean Patent Application No. 10-2014-0163767 filed in the Korean Intellectual Property Office on Nov. 21, 2014, the entire content of which is incorporated herein by reference.

TECHNICAL FIELD

The present disclosure relates to a door structure of a vehicle. More particularly, the present disclosure relates to a door structure of a vehicle, which enhances the stiffness of a door trim by combining a door trim frame with the door trim in a slim door in which a door inner panel is combined with a door outer panel.

BACKGROUND

A vehicle interior is generally of a sufficient size so that a driver and a passenger may ride in the vehicle body of the vehicle. In order to open and shut the vehicle interior, vehicle interior opening/shutting doors are installed in the vehicle body.

In general, in the case of a passenger vehicle, the vehicle interior opening/shutting doors may include front doors installed towards the front of the length direction of the vehicle and rear doors installed towards the rear of the length direction of the vehicle. The front doors and the rear doors are rotatably installed in the vehicle body through the medium of hinges.

Such a conventional vehicle interior opening/shutting door includes a door outer panel disposed on the outside of the vehicle, a door inner panel disposed on the inside interior of the vehicle, integrally combined with the door outer panel and configured to form a mounting space of a specific size between the door inner panel and the door outer panel, and a door trim installed on the inside toward the vehicle interior in the door inner panel and configured to improve the aesthetics of the door and to have parts, such as switches related to the door and a door window installed therein.

A support member is generally attached to the door outer panel to increase structural stiffness. In order to prevent excessive deformation of the door when a collision accident occurs on the side of the vehicle, a reinforcement member is attached to the door outer panel. An inner rail of a door frame is combined with the upper part of the door inner panel in the vertical direction of the vehicle. An outer rail is combined with the upper part of the door outer panel that faces the inner rail to support the door window glass. The door inner panel also supports a door module on which a window regulator is mounted.

In such a conventional door structure of a vehicle, however, the door inner panel and the door outer panel are spaced apart from each other and combined so that a mounting space on which parts related to the door are mounted is formed between the door inner panel and the door outer panel. Accordingly, there are disadvantages to this conventional structure, including that this increases the thickness of the door and the weight of the vehicle because many parts are installed in this mounting space, such as the support member of the door outer panel and the inner and outer rails related to the door window glass.

Accordingly, in recent years, in order to reduce the thickness of the vehicle door, a so-called slim door has been developed, in which a door inner panel and a door outer panel are assembled in a state in which they are disposed as close together as possible. In such a slim door, when a door trim is mounted on the door inner panel, there is a need for a structure that increases the mounting stiffness of the door trim and increasing the stiffness of the door trim itself.

The above information disclosed in this Background section is only for enhancing the understanding of the background of the inventive concept disclosed herein and therefore it may contain information that does not form part of the prior art that is already known in this country to a person of ordinary skill in the art.

SUMMARY OF THE DISCLOSURE

The present disclosure is made in an effort to provide a door structure of a vehicle having the advantages of increasing the mounting stiffness of a door trim and increasing the stiffness of the door trim itself. The structure is combined with the door trim in a slim door, improving vibration resistance and noise cancellation due to the improved stiffness of the door trim, and in addition the present disclosure provides for easy workability.

An embodiment of the present inventive concept provides a door structure of a vehicle, comprising a door trim and a door trim frame combined with the door trim in order to increase the stiffness of the door trim.

The door trim frame may include a door trim frame body curved in an approximate 'U'-shape and a reinforcement frame formed to cross the opening of the door trim frame body in a horizontal direction in such a way as to be extended and integrally combined with the door trim frame body.

The door trim frame body and the reinforcement frame may each have a strip shape where length is greater than width.

A door checker may be mounted on a portion of the door trim frame body adjacent to a portion combined with the reinforcement frame.

A door latch detachably combined with a striker mounted on a vehicle body may be mounted at the front end of the door trim frame body.

The door trim may include a door trim body configured to have an approximately flat panel shape and a door trim flange extended along the edges of the three faces of the door trim body, curved with respect to the door trim body, and integrally formed with the door trim body.

The door trim frame body may be combined with the door trim such that the door trim frame body may be closely attached to the inside of the door trim flange.

A plurality of protrusion portions may be integrally protruded from the door trim flange and formed in the door trim flange forming insertion grooves. The door trim frame body may be inserted into the insertion grooves and assembled with the door trim, and an assembly bolt may penetrate the door trim flange and the door trim frame body. This assembly may be engaged to the door inner panel by welding with a welded nut.

There may be plural engagement portions along the edge of the door trim where the door trim and the door trim frame are engaged with the door inner panel by the assembly bolt.

Engagement flanges for engaging the door trim and the door trim frame with the door inner panel may be integrally curved and formed in the door trim and the door trim frame.

A clip for engaging the door trim with the door trim frame may be formed between the plurality of engagement portions.

The door checker may include a mounting bracket. Assembly bolts may be configured to penetrate the mounting bracket and the door trim frame and engaged with the mounting bracket and the door trim frame in the state in which the mounting bracket has been directed toward the door trim frame body.

The door trim frame and the door trim may be combined so that the assembly bolts for engaging the door checker with the door trim frame are externally covered.

In accordance with the door structure of a vehicle according to an embodiment of the present inventive concept, both the mounting stiffness of the door trim and the structural stiffness of the door trim may be improved, and vibration noise in a vehicle door may be reduced because the door trim frame having an approximately 'U'-shape is engaged with the door trim.

The assembly productivity of a vehicle door can be improved, the number of parts and weight can be reduced, costs can be reduced, and fuel consumption can be improved because the door latch as well as the door checker are mounted on the door trim frame, modulated, and input to a vehicle assembly line.

DETAILED DESCRIPTION OF THE EMBODIMENTS

Hereinafter, exemplary embodiments of the present inventive concept are described in detail with reference to the accompanying drawings.

Figure 1:
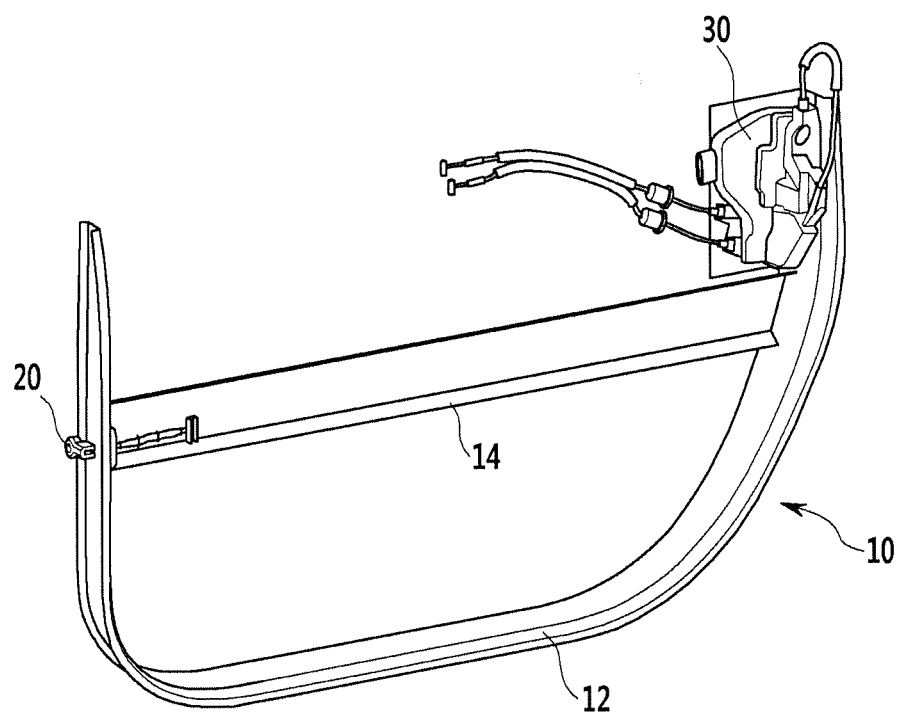
FIG. 1 is a perspective view of a door trim frame in accordance with an embodiment of the present inventive concept.

Referring to FIG. 1, a door structure of a vehicle in accordance with an embodiment of the present inventive concept may include a door trim frame 10.

The door trim frame 10 may include a door trim frame body 12 curved in an approximate 'U'-shape and a reinforcement frame 14 formed to cross the opening of the door trim frame body 12 in a horizontal direction in such a way as to be extended and integrally combined with the door trim frame body 12.

Each of the door trim frame body 12 and the reinforcement frame 14 may have a strip shape having length greater than width.

A door checker 20 may be mounted on a portion of the door trim frame body 12 adjacent to a portion of the door trim frame body 12 that is combined with the reinforcement frame 14.

The door checker 20 functions to control the opening and shutting of a vehicle door.

A door latch 30 may be mounted on the front end of the door trim frame body 12 on one side, and may grasp and fix a striker (not illustrated) mounted on the vehicle body in order to maintain the closed state of the vehicle door or release the grasped striker so that the vehicle door will open.

If the door checker 20 and the door latch 30 are previously assembled in the door trim frame 10 as described above, the assembly task of the door trim frame 10, the door checker 20, and the door latch 30 may be facilitated because a surrounding work space is potentially increased. Furthermore, when the door checker 20 and the door latch 30 are supplied to a vehicle assembly line in the state where the door checker 20 and the door latch 30 have been previously assembled in the door trim frame 10, the assembly productivity of a vehicle can be improved.

Figure 2:
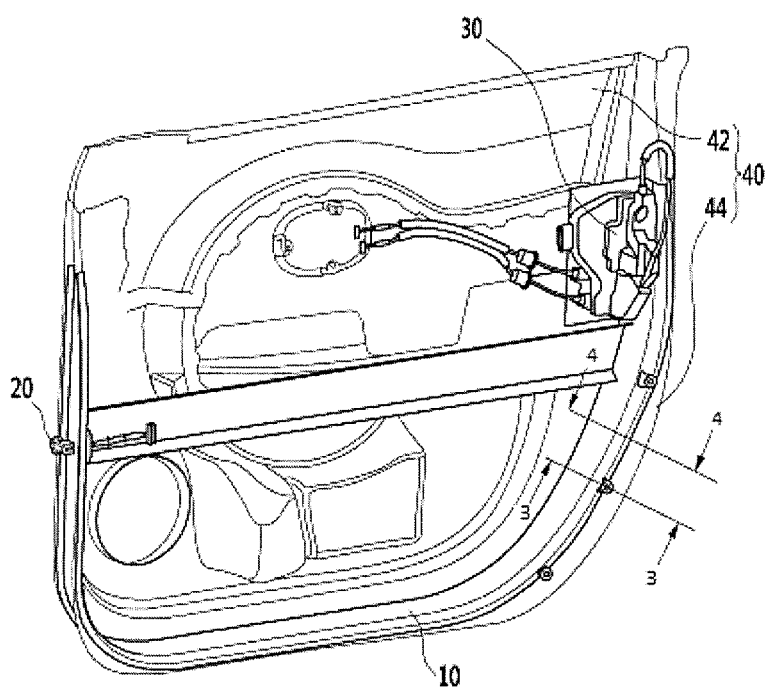
FIG. 2 is a perspective view illustrating the door trim frame in accordance with an embodiment of the present inventive concept combined with a door trim.

Referring to FIG. 2, the handle of a door trim 40 may be mounted on the door trim frame 10 through the medium of a mounting bracket, and may function to increase the mounting stiffness of the handle of the door trim 40.

The door trim 40 may include a door trim body 42 configured to have an approximately flat panel shape and a door trim flange 44 extended along the edges of three faces of the door trim body 42, curved with respect to the door trim body 42, and integrally formed with the door trim body 42.

The door trim frame body 12 of the door trim frame 10 may be combined with the door trim 40 so that it is closely attached to the inside of the door trim flange 44.

If the door trim frame 10 is combined with and mounted on the door trim 40 as described above, the stiffness of the door trim 40 itself and the mounting stiffness of the door trim 40 with a door inner panel to be described later are increased. Accordingly, when a vehicle is driven or a door is open and shut, the door trim 40 can be prevented from shaking due to an external impact, and noise attributable to the vibration of the door trim 40 can also be reduced.

Figure 3:
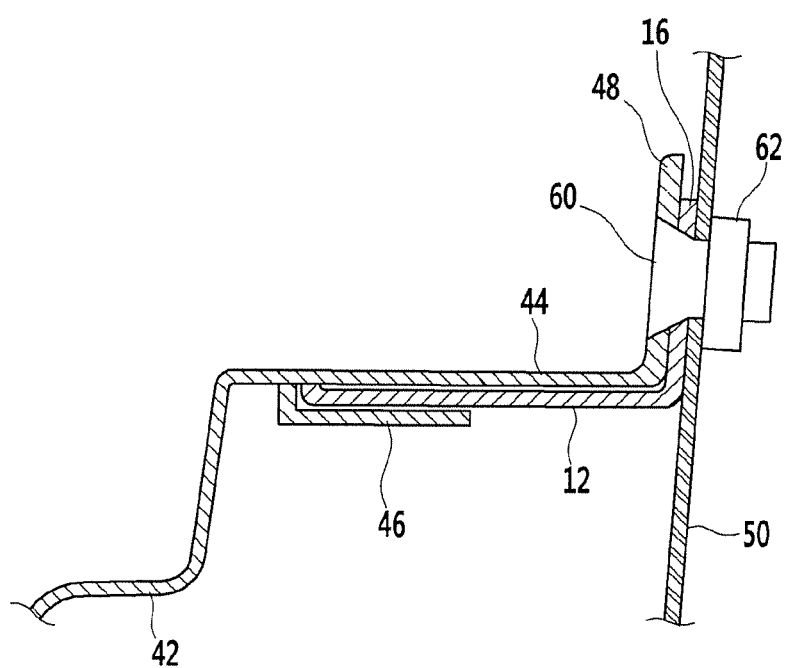
FIG. 3 is a cross-sectional view taken along line 3-3 of FIG. 2.

Referring to FIG. 3, a plurality of protrusion portions 46 may be integrally protruded from the door trim flange 44 and formed in the door trim flange 44 in order to form insertion grooves. The door trim frame body 12 of the door trim frame 10 may be inserted and assembled into the insertion grooves, and an assembly bolt 60 may penetrate the door trim flange 44, and the door trim frame body 12, and the door inner panel 50 may be engaged with a welded nut 62 attached to a door inner panel 50 by welding. Accordingly, the door trim 40 and the door trim frame 10 can be assembled with the door inner panel 50.

There may be plural engagement portions along the edge of the door trim 40 where the door trim 40 and the door trim frame 10 are engaged with the door inner panel 50 by the assembly bolt 60.

In order to engage the door trim 40 and the door trim frame 10 with the door inner panel 50, engagement flanges 48 and 16 may be integrally curved and formed in the door trim 40 and the door trim frame 10.

Such a method of assembling the door trim 40 and the door trim frame 10 with the door inner panel 50 can improve assembly productivity and can stably mount and support the door trim 40 and the door trim frame 10 on the door inner panel 50.

Figure 4:
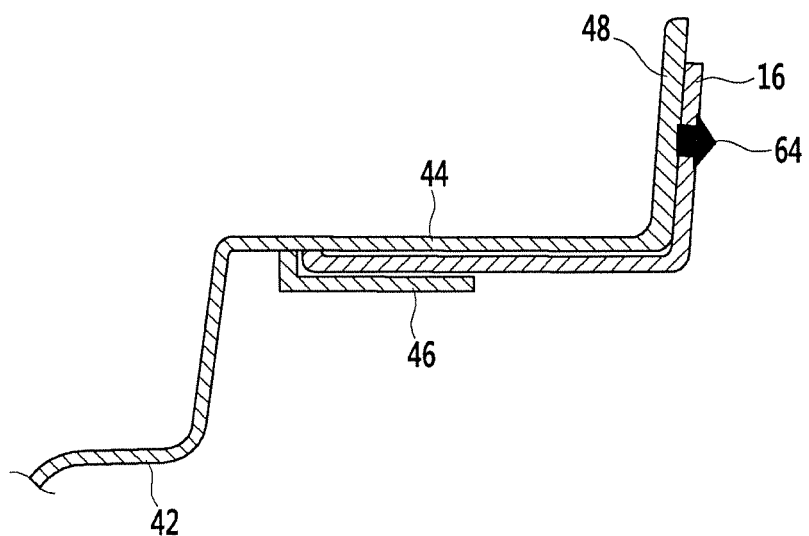
FIG. 4 is a cross-sectional view taken along line 4-4 of FIG. 2.

Referring to FIG. 4, a clip 64 may be used between the plurality of engagement portions in order to improve the assembly stiffness of the door trim 40 and the door trim frame 10.

The clip 64 may penetrate the door trim 40 and the door trim frame 10, and may be assembled with the door trim 40 and the door trim frame 10. Alternatively, the clip 64 may be mounted on the door trim 40 and may penetrate the assembly hole of the door trim frame 10 so that the door trim 40 and the door trim frame 10 are engaged by the clip 64.

If the door trim 40 and the door trim frame 10 are assembled with a plurality of portions using the clips 64 as described above, the door trim 40 and the door trim frame 10 can continue to maintain a stable assembly posture because assembly stiffness is increased.

Figure 5:
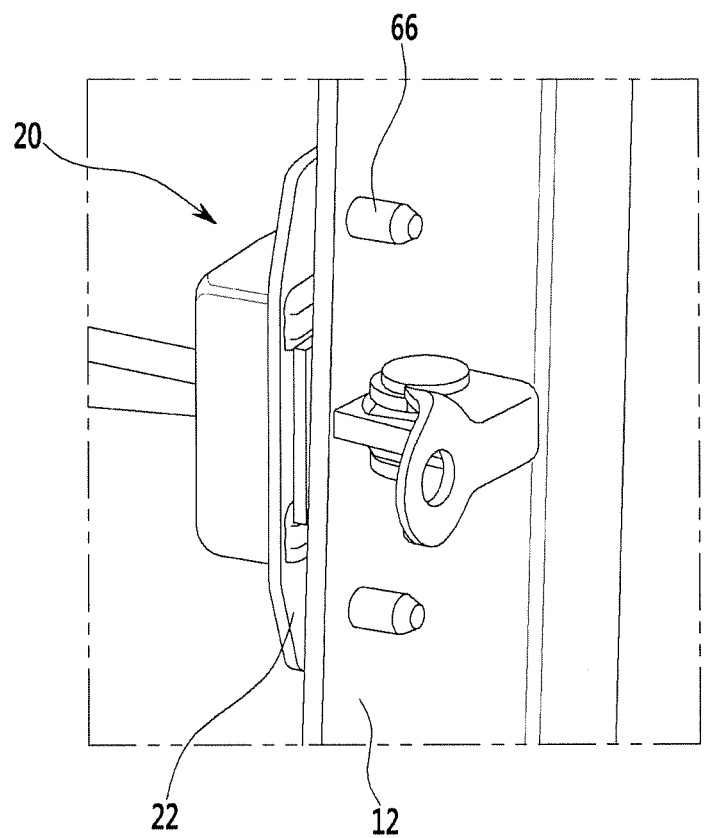
FIG. 5 is a perspective view illustrating a door checker combined with the door trim frame in accordance with an embodiment of the present inventive concept.

Referring to FIG. 5, the door checker 20 may include a mounting bracket 22. When the mounting bracket 22 is directed toward the door trim frame body 12, assembly bolts 66 may penetrate the mounting bracket 22 and the door trim frame 12 so that the door checker 20 is assembled and mounted on the door trim frame 10.

Such a mounting structure of the door checker 20 can reduce the number of parts and weight because a door checker cover is not required compared to a conventional door checker mounting structure.

Figure 6:
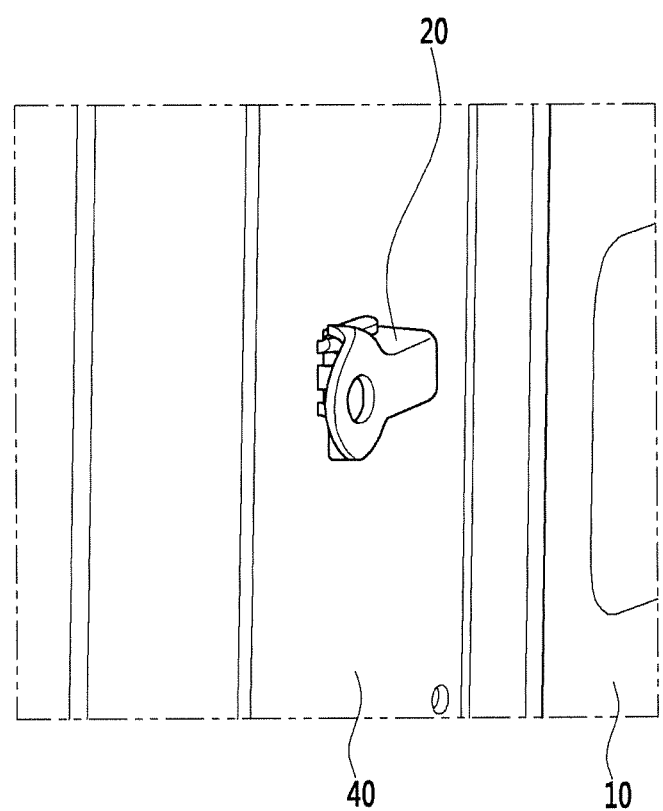
FIG. 6 is a cutaway perspective view of a portion of the door trim frame in which a door checker has been mounted and combined with the door trim in accordance with an embodiment of the present inventive concept.

Referring to FIG. 6, when the door trim frame 10 is combined with the door trim 40 in the state in which the door checker 20 has been mounted on the door trim frame 10, the external appearance can be improved because the assembly bolts 66 for mounting the door checker 20 on the door trim frame 10 are covered by the door trim 40.

While this inventive concept has been described in connection with multiple embodiments, it is understood that the inventive concept is not limited to the disclosed embodiments, but, on the contrary, is intended to cover various modifications and equivalent arrangements included within the spirit and scope of the appended claims.

What is claimed is:

1. A door structure of a vehicle, comprising:
   a door trim panel; and
   a door trim frame that is mounted on the door trim panel and increases a stiffness of the door trim panel,
   wherein the door trim frame comprises a door trim frame body, and
   the door trim panel comprises:
      a door trim body;
      a door trim flange extending along three edges of the door trim body, bent with respect to the door trim body, and integrally formed with the door trim body, and
      the door trim flange includes a plurality of protrusions each being integrally formed with the door trim flange and protruding from the door trim flange to form an insertion groove with the door trim flange,
   the door trim frame body is inserted into the insertion grooves, and
   an assembly bolt penetrating through the door trim flange, the door trim frame body, and a door inner panel, and
   the assembly bolt is engaged with a welded nut which is disposed on the door inner panel.

2. The door structure of claim 1, wherein the door trim frame further comprises:
   a reinforcement frame that engages the door trim frame body in a horizontal, and
   the door trim frame body is an approximately 'U'-shape.

3. The door structure of claim 2, wherein the reinforcement frame is integrally combined with the door trim frame body.

4. The door structure of claim 2, wherein a length of the door trim frame body is greater than a width of the door trim frame body, and a length of the reinforcement frame is greater than a width of the reinforcement frame.

5. The door structure of claim 2, wherein a door checker is mounted on a first portion of the door trim frame body that is adjacent to a second portion of the door trim frame body, the second portion of the door trim frame body being combined with the reinforcement frame.

6. The door structure of claim 5, wherein:
   the door checker comprises a mounting bracket, and
   an assembly bolt connects the mounting bracket to the door trim frame body, and
   the mounting bracket is disposed on the door trim frame body.

7. The door structure of claim 6, wherein the door trim frame and the door trim panel are combined such that the assembly bolt is covered by the door trim panel.

8. The door structure of claim 2, wherein a door latch is mounted to one side of the door trim frame body.

9. The door structure of claim 1, wherein the door trim frame body contacts the door trim flange.

10. The door structure of claim 1,
    wherein said assembly bolt comprises a plurality of assembly bolts
    wherein each of the plurality of assembly bolts penetrates through the door trim flange, the door trim frame body, and the door inner panel, and
    said welded nut comprises a plurality of welded nuts which are disposed on the door inner panel.

11. The door structure of claim 1, wherein the door trim flange and the door trim frame body each further an engagement flange, the engagement flanges being configured to engage the door trim panel and the door trim frame with the door inner panel.

* * * * *